UNITED STATES PATENT OFFICE 2,393,208

COAGULATION OF LATICES

Wendell W. Waterman, Cranford, N. J., and Paul T. Parker, Baton Rouge, La., assignors to Standard Oil Development Company, a corporation of Delaware No Drawing. Application August 22, 1942,
Serial No. 455,730

10 Claims. (Cl. 260—86.5)

This invention pertains to the production of high molecular weight polymers. More particularly, the invention pertains to the coagulation of latices of emulsion copolymerizates of styrenes and diolefins.

In the preparation of emulsion polymerizates of diolefins the latices formed have usually been coagulated by adding alcohol, brine, or any suitable acidic material such as dilute acetic or hydrochloric acid under conditions of good agitation. This procedure has been quite satisfactory for the production of synthetic rubberlike materials, such as butadiene or isoprene emulsion polymerizates, or emulsion copolymerizates of butadiene and acrylic acid nitrile and even certain butadiene-styrene copolymers which are of a rubber-like nature. It has been found, however, to be entirely unsatisfactory for the coagulation of latices of certain resinous copolymers obtained by the polymerization in aqueous emulsion of mixtures of styrenes and diolefins particularly for the coagulation of emulsion polymerizates containing the styrene and the diolefin in the ratio of from about 95/5 to about 65/35. When brine or other coagulent is added to latices of this type it has been found that a thick, viscous mass of coagulate is formed at an intermediate point in the coagulation step, i. e., at a point before the addition of the coagulant has been completed. In an effort to avoid the formation of this thick, viscous mass of coagulate a series of tests were made in which the brine, the latex, and both the brine and the latex were highly diluted. It was found, however, that even if the latices were diluted with as much as 5 parts of water prior to coagulation, the thickening or solidification of the coagulate could not be avoided.

In the commercial production of materials of this type it is extremely important that the coagulation be carried out not only in such a manner as to avoid the formation of large masses of material, but also to give a finely divided coagulate of proper particle size in slurry form so that the polymer may be separated from the liquor by filtration, screening or centrifuging and thoroughly washed to complete the removal of impurities. In order that the filtration and washing step may be carried out satisfactorily, it is necessary to obtain a particle size within a certain range because the capacity of the filtration equipment as well as the overall efficiency of the product purification operations is seriously affected by variations in particle size.

It is an object of our invention to provide the art with a novel method of coagulating emulsion polymerizates of styrenes and diolefins.

It is a further object of our invention to provide a method of coagulating latices of the emulsion polymerizates of mixtures of styrene and isoprene wherein the formation of solid masses or jelly of the copolymerizate is avoided and a coagulate of particle size suitable for efficient filtration and washing is obtained.

We have found that the tendency towards mass coagulation of copolymers of styrenes and diolefins and particularly of copolymers containing from about 65 to about 95% of the styrene, and from about 35 to about 5% of the diolefin may be avoided by adding the latex to the coagulant solution under proper conditions of agitation. We have further found that the particle size of the coagulate obtained by such addition of the latex to a coagulant such as sodium chloride brine is a function of the temperature at which coagulation is effected. By means of the process we have discovered it is possible to effect coagulation without the formation of a viscous mass and to obtain a coagulate having a particle size which is optimum for subsequent filtration and washing operations.

The emulsion copolymerizates which are coagulated to advantage in accordance with the the present invention are prepared by interpolymerizing 65 to 95% by weight of a vinyl aromatic hydrocarbon of the structural formula

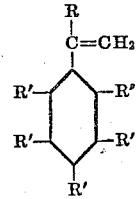

wherein R and R' are selected from the group consisting of hydrogen and alkyl groups with 5 to 35% by weight of a diolefin capable of copolymerizing with such aromatic hydrocarbons while dispersed in an aqueous medium in the presence of a catalyst and at temperatures above about 95° F. Suitable vinyl aromatic hydrocarbons include styrene, alpha methyl styrene, para methyl styrene, alpha methyl para methyl styrene or the like. The diolefins which may be used include, for example, butadiene, isoprene, piperylene or 2.3 dimethylbutadiene-1,3. The ratio of reactants to water in the preparation of the latex is about 1/2. Suitable emulsifiers such as sodium oleate, sodium palmitate and sodium stearate, catalysts such as hydrogen peroxide, sodium perborate and potassium or ammonium persulfates, and a modifier such as carbon disulfide are generally used. The polymerization may be effected at a temperature of about 135° to 145° F. and for a period of from about 12 to about 22 hours. Upon the completion of the polymerization the latex is usually stripped of unpolymerized reactants by steam and/or vacuum distillation. The preparation of such copolymers is described in application Serial No. 408,814, filed August 29, 1941, by Anthony H. Gleason, Per K. Frolich and William J. Sparks, entitled, "Modified styrene interpolymers."

In accordance with the process of the present invention, the most advantageous results are obtained when either the latex is is added very slowly to the brine under conditions of good agitation or when the latex is introduced as a number of small streams so that the agitation results in rapid dispersion of the latex into the mixture. One particularly advantageous method of carrying out this operation commercially involves agitating the brine in a large vessel, preferably by means of a turbine agitator, and adding the latex through a distributor such as a spray nozzle assembly, a distributor ring in the vapor space, or a distributor ring or other suitable injection device arranged below the liquid level. As an example of the latter method, the latex may be injected into the brine through a stator ring provided with certain types of turbine agitators. In such a unit the turbine is equipped with stator rings below and above the rotor through which the latex may be injected into a zone of extremely high turbulence, thus providing a means of rapidly dispersing the latex into the brine. In a continuous process, the latex may be satisfactorily coagulated under the conditions of dilution and temperature used in batch operation, by simultaneously feeding dilute latex and brine to a vessel with good agitation, an excess of brine being maintained in the vessel. The resulting slurry is drawn off continuously and passed to the filtration and washing operations.

Another way in which the process of the present application may be carried out is by the injection of the latex into a rapidly moving stream of brine. For example, if the operation is to be carried out batchwise the agitation may be obtained by outside circulation of the brine through a pump, the latex being injected into the stream at a point of maximum turbulence. The operation may be made continuous by injecting the latex continuously into a stream containing an excess of brine at a point of high turbulence.

The coagulant which is preferred for our process is a 13-20% sodium chloride brine. However, other coagulants may be used, such as other halides of sodium or potassium, the sulfates, nitrates, phosphates and other inorganic salts of sodium or potassium, alcohols such as methyl, ethyl and isopropyl alcohols, and in the case of saturated fatty acid soaps as emulsifiers, organic acids such as acetic, formic and propionic acids. Salts of alkaline earths can also be used but ordinarily are not desirable when soap emulsifiers are used because they precipitate insoluble soaps in the product.

The coagulation in accordance with our invention is preferably effected at temperatures between about 85° F. and about 130° F. Within this temperature range, the coagulate obtained is a fine, non-tacky slurry which is easily further processed.

The following examples demonstrate the advantages of the process herein described, but it is to be understood that the invention is not limited thereto:

Example 1

A latex prepared by emulsion-polymerization of a mixture of styrene and isoprene (the styrene-isoprene ratio being 73.3/26.7 was coagulated by means of an 18.3% sodium chloride solution by the following procedure: A 10 gallon portion of the latex having a polymer content of 29% by weight was diluted with 5 gallons of water and added to 15 gallons of 18.3% brine in a 57 gallon vessel equipped with an 8" turbine rotor operated at 430 R. P. M. The temperature of the diluted latex was 100° F. and that of the brine 100° F. The diluted latex was added to the brine over a period of 11 minutes. The coagulation proceeded smoothly, there being no tendency toward thickening of the mixture or formation of large agglomerates. A slurry of optimum particle size having excellent filtration and washing characteristics was obtained.

Example 2

A 600 ml. portion of a latex prepared by the method described in Example 1 was coagulated in a 2000 ml. vessel provided with good agitation. In this case 600 ml. of 26% brine at 95° F. was added to the undiluted latex at 95° F. After the addition of 200 ml. of brine the material thickened suddenly to a viscous mass of agglomerated particles which stopped the stirrer. Mechanical agitation was not sufficient to break up the mass.

Example 3

A 400 ml. portion of the latex employed in Example 2 was diluted with 800 ml. of water and coagulated in the same vessel under the same conditions of agitation and temperature. In this case 400 ml. of 26% brine was added to the latex. After the addition of 270 ml. of brine the coagulate formed a thick viscous mass which did not, however, stop the stirrer. The agitation however was only sufficient to cut a small hole in the material in which the agitator rotated. The agitator was not capable of breaking up the mass into a slurry of satisfactory particle size even after the addition of the remainder of the brine.

Example 4

A 200 ml. portion of the latex used in the Example 2 was diluted with 1000 ml. of water and coagulated by the addition of 200 ml. of 26% brine under the same conditions of agitation and temperature. The materials thickened to a gel-like mass after the brine addition was complete, but in this case the agitation was sufficient to eventually break up the mass and establish a slurry.

Example 5

A 300 ml. portion of the latex employed in Example 2 was diluted with 300 ml. of water and coagulated by the addition of 600 ml. of 13% brine in the same vessel and under the same conditions of agitation and temperature. In this case the material formed a thick viscous mass after the addition of 190 ml. of brine. Agitation alone did not break up the mass.

Example 6

A 350 ml. portion of the latex employed in Example 2 was diluted with 175 ml. of water and cooled to 45° F. The cooled mixture was added with good agitation to 525 ml. of 18% brine at a temperature of 44° F. over a period of 125 seconds. The mixture thickened to a semi-solid mass which was not broken up by the agitation. After manually breaking up the mass, the agitation gave a slurry of extremely fine particles not suitable for filtration.

*Example 7*

A 350 ml. portion of the latex employed in Example 2 was mixed at 85° F. with 175 ml. of water and coagulated by adding the mixture to 525 ml. of 18% brine at 84° F. with good agitation over a period of 187 seconds. Some lumps formed which broke up with the agitation to give a slurry of satisfactory particle size for filtration and washing.

*Example 8*

A 350 ml. portion of the latex employed in Example 2 was mixed at 115° F. with 175 ml. of water and coagulated by adding the mixture to 525 ml. of 18% brine at 114° F. with good agitation over a period of 185 seconds. No thickening occurred and a slurry of satisfactory particle size for filtration and washing was formed.

*Example 9*

A 300 ml. portion of the latex employed in Example 2 at a temperature of 130° F. was added to 600 ml. of 13% brine at a temperature of 130° F. with good agitation over a period of 137 seconds. Some thickening occurred, but the mass was readily broken up by the agitation to form a slurry of satisfactory particle size for filtration and washing. The particles were soft, but hardened on cooling.

*Example 10*

A 4 l. portion of the latex employed in the previous examples was diluted with 2 l. of water and coagulated in a 5 gallon vessel equipped with a 4" turbine rotor operated at 450 R. P. M. The latex at 115° F. was added to 6 l. of 18.3% brine at 86° F. over a period of 450 seconds. The temperature after coagulation was 99° F. and the polymer was precipitated as rather fine particles satisfactory for filtration and washing, there being no observable tendency toward thickening of the mixture or the formation of large agglomerates.

The foregoing examples illustrate the effects of the variables (1) method of combination of brine and latex, (2) dilution and (3) temperature. In Example 2 the coagulant solution was added to the undiluted latex under conditions of good agitation, this method being the one usually employed in the coagulation of such latices. The temperatures employed were in the range found to be optimum for addition of the latex to the coagulant. In this case the formation of a viscous mass of agglomerated particles was encountered. This is to be contrasted with the results obtained in Example 1, which is representative of the present invention. In Example 1 the latex was added to the brine under similar conditions of agitation and temperature with the result that a slurry of optimum particle size having excellent filtration and washing characteristics was obtained.

Examples 2, 3, 4 and 5 illustrate the effect of dilution in the conventional procedure of adding the coagulant to the latex. In Examples 2, 3 and 4 a saturated sodium chloride solution was added to samples of latex diluted respectively with 0, 2 and 5 parts of water per part of latex under suitable conditions of agitation and temperature. Even with the 5:1 dilution satisfactory coagulation was not obtained. In Example 5 the brine and the latex were diluted separately with equal parts of water without improvement of results in the coagulation. These examples are to be contrasted with the results obtained in Example 1 in which the latex diluted with only ½ part of water per part of latex was added to 18.3% brine with very satisfactory results.

Examples 1, 6, 7, 8 and 9 illustrate the effect of temperature in coagulating by the addition of latex to the coagulant. We have found that there exists an optimum temperature range extending from about 85° F. to about 130° F. When the coagulation was carried out at a temperature substantially below 85° F. as in Example 6, extremely fine particles which could not be conveniently filtered and washed were obtained. Furthermore some agglomeration of the particles at the lower temperatures was encountered. At temperatures from about 85° F. to 130° F. satisfactory coagulation may be carried out by the present method as illustrated by Examples 1, 7, 8 and 9. At the lower end of this temperature range, as illustrated by Example 7 and at the upper end as illustrated by Example 9, although satisfactory coagulation may be carried out incipient agglomeration was observed. At intermediate temperatures slurrys of excellent characteristics were obtained, particularly in the temperature range from about 95° F. to about 120° F.

Examples 1, 8 and 10 represent coagulation under preferred conditions at different scales of operations. These tests demonstrate that the agitation in the three types of equipment was comparable within a reasonable range of variation, and in Examples 1 and 10 the operation was on a scale sufficiently large to permit accurate extrapolation to regular commercial equipment.

What we claim and desire to secure by Letters Patent is:

1. The process of coagulating a latex obtained by the polymerization of a mixture containing about 65 to about 95% of a vinyl aromatic compound selected from the group consisting of styrene, alpha methyl styrene, para methyl styrene and alpha methyl para methyl styrene with 5 to 35% by weight of a conjugated diolefin containing from 4 to 6 carbon atoms per molecule while dispersed in an aqueous medium in the presence of a catalyst and at temperatures above about 95° F. which comprises introducing such a latex into an agitated coagulant solution at a temperature between about 85 and about 130° F.

2. The process as defined in claim 1 wherein the coagulant solution is maintained at a temperature of between 95 and 120° F.

3. The process of coagulating a latex obtained by the polymerization of a mixture containing about 65 to about 95% of a vinyl aromatic compound selected from the group consisting of styrene, alpha methyl styrene, para methyl styrene and alpha methyl para methyl styrene with 5 to 35% by weight of a conjugated diolefin containing from 4 to 6 carbon atoms per molecule while dispersed in an aqueous medium in the presence of a catalyst at temperatures above about 95° F. which comprises introducing such a latex into an agitated sodium chloride brine solution at a temperature between about 85 and about 130° F.

4. The process of coagulating a latex obtained by the polymerization of a mixture containing about 65 to about 95% of styrene and about 35 to about 5% of a conjugated diolefin containing from 4 to 6 carbon atoms per molecule in aqueous emulsion which comprises introducing such a latex into an agitated coagulant solution at a temperature between about 85 and about 130° F.

5. The process of coagulating a latex obtained by the polymerization of a mixture containing about 65 to about 95% of styrene and about 35 to about 5% of a conjugated diolefin containing from 4 to 6 carbon atoms per molecule in aqueous emulsion which comprises introducing such a latex into an agitated sodium chloride brine solution at a temperature between about 85 and about 130° F.

6. The process of coagulating a latex obtained by the polymerization of a mixture containing about 65 to about 95% of styrene and about 35 to about 5% of butadiene-1,3 in aqueous emulsion which comprises introducing such a latex into an agitated coagulant solution at a temperature between about 85 and about 130° F.

7. The process of coagulating a latex obtained by the polymerization of a mixture containing about 65 to about 95% of styrene and about 35 to about 5% of butadiene-1,3 in aqueous emulsion which comprises introducing such a latex into an agitated sodium chloride brine solution at a temperature between about 85 and about 130° F.

8. The process of coagulating a latex obtained by the polymerization of a mixture containing about 65 to about 95% of styrene and about 35 to about 5% of isoprene in aqueous emulsion which comprises introducing such a latex into an agitated coagulant solution at a temperature between about 85 and about 130° F.

9. The process of coagulating a latex obtained by the polymerization of a mixture containing about 65 to about 95% of styrene and about 35 to about 5% of isoprene in aqueous emulsion which comprises introducing such a latex into an agitated sodium chloride brine solution at a temperature between about 85 and about 130° F.

10. The process of coagulating a latex obtained by the polymerization of a mixture containing about 65 to about 95% of styrene and about 35 to about 5% of isoprene in aqueous emulsion which comprises introducing such a latex into an agitated sodium chloride brine solution at a temperature between 95 and 120° F.

WENDELL W. WATERMAN.
PAUL T. PARKER.